United States Patent

Sugiura et al.

(10) Patent No.: US 10,056,619 B2
(45) Date of Patent: Aug. 21, 2018

(54) FUEL CELL HAVING A RECESS IN THE SEPARATOR

(71) Applicant: HONDA MOTOR CO., LTD., Minato-Ku, Tokyo (JP)

(72) Inventors: Seiji Sugiura, Utsunomiya (JP); Hiroshi Shinkai, Utsunomiya (JP); Kenichi Tanaka, Utsunomiya (JP); Mihoko Kawaharada, Saitama (JP); Kenta Urata, Utsunomiya (JP); Yukihito Tanaka, Saitama (JP); Takashi Kato, Tochigi-Ken (JP)

(73) Assignee: Honda Motor Co., Ltd., Tokyo (JP)

( * ) Notice: Subject to any disclaimer, the term of this patent is extended or adjusted under 35 U.S.C. 154(b) by 645 days.

(21) Appl. No.: 13/661,224

(22) Filed: Oct. 26, 2012

(65) Prior Publication Data

US 2013/0108942 A1 May 2, 2013

(30) Foreign Application Priority Data

Nov. 1, 2011 (JP) ................................ 2011-240366
Nov. 1, 2011 (JP) ................................ 2011-240367

(51) Int. Cl.
*H01M 8/10* (2016.01)
*H01M 4/86* (2006.01)
(Continued)

(52) U.S. Cl.
CPC ........ *H01M 4/8605* (2013.01); *H01M 8/0247* (2013.01); *H01M 8/1007* (2016.02); *H01M 8/0271* (2013.01)

(58) Field of Classification Search
CPC .. H01M 8/0276; H01M 8/0247; H01M 8/242; H01M 4/8605; H01M 8/1007; H01M 8/0271
See application file for complete search history.

(56) References Cited

U.S. PATENT DOCUMENTS

2003/0104262 A1* 6/2003 Kuroki ............... H01M 8/0213
429/510
2009/0017362 A1* 1/2009 Hayashi ............. H01M 8/0247
429/457
(Continued)

FOREIGN PATENT DOCUMENTS

JP 10-241707 A 9/1998
JP 2003-068332 A 3/2003
(Continued)

OTHER PUBLICATIONS

Japanese Office Action dated May 13, 2014 issued over the corresponding JP Patent Application 2011-240366 with the English translation of pertinent portion.

*Primary Examiner* — Milton I Cano
*Assistant Examiner* — Philip A. Stuckey
(74) *Attorney, Agent, or Firm* — Carrier Blackman & Associates, P.C.; Joseph P. Carrier; William D. Blackman

(57) ABSTRACT

A membrane electrode assembly with protective film includes a MEA and protective films. The MEA includes a cathode, an anode, and a solid polymer electrolyte membrane interposed between the cathode and the anode. The protective films are joined on the outer end of the solid polymer electrolyte membrane. The membrane electrode assembly has a power generation area and an edge-vicinity area. Recesses for receiving the edge-vicinity area including outer ends of the cathode and the anode are formed in outer portions of a cathode-side separator and an anode-side separator which contact the MEA.

6 Claims, 18 Drawing Sheets

(51) Int. Cl.
*H01M 8/0247* (2016.01)
*H01M 8/1007* (2016.01)
*H01M 8/0271* (2016.01)

(56) References Cited

U.S. PATENT DOCUMENTS

| | | | |
|---|---|---|---|
| 2009/0053573 A1* | 2/2009 | Shibata et al. | 429/30 |
| 2009/0246586 A1* | 10/2009 | Kawabata et al. | 429/30 |
| 2010/0047649 A1 | 2/2010 | Yamada et al. | |
| 2014/0011114 A1* | 1/2014 | Parsons | H01M 8/0271 |
| | | | 429/482 |

FOREIGN PATENT DOCUMENTS

| | | |
|---|---|---|
| JP | 2006-210027 A | 8/2006 |
| JP | 2006-260810 A | 9/2006 |
| JP | 2006-338938 A | 12/2006 |
| JP | 2007-042347 A | 2/2007 |
| JP | 2008-041337 A | 2/2008 |
| JP | 2008-135295 A | 6/2008 |
| JP | 2010-003470 A | 1/2010 |

\* cited by examiner

FUEL CELL HAVING A RECESS IN THE SEPARATOR

CROSS-REFERENCE TO RELATED APPLICATIONS

This application is based upon and claims the benefit of priority from Japanese Patent Applications No. 2011-240366 filed on Nov. 1, 2011, and No. 2011-240367 filed on Nov. 1, 2011, the contents all of which are incorporated herein by reference.

BACKGROUND OF THE INVENTION

Field of the Invention

The present invention relates to a fuel cell including a membrane electrode assembly and separators provided on both surfaces of the membrane electrode assembly. The membrane electrode assembly includes a first electrode, a second electrode, and a solid polymer electrolyte membrane interposed between the first electrode and the second electrode. Each of the first electrode and the second electrode includes an electrode catalyst layer and a gas diffusion layer.

Description of the Related Art

In general, a solid polymer electrolyte fuel cell employs a solid polymer electrolyte membrane. The solid polymer electrolyte membrane is a polymer ion exchange membrane. In the fuel cell, the solid polymer electrolyte membrane is interposed between an anode and a cathode to form a membrane electrode assembly (MEA). Each of the anode and the cathode includes a catalyst layer (electrode catalyst layer) and a gas diffusion layer (porous carbon). The membrane electrode assembly is sandwiched between separators. In use, generally, a predetermined number of fuel cells are stacked together to form a fuel cell stack, e.g., mounted in a vehicle.

In some cases, in the membrane electrode assembly of this type, the position of an outer end of one catalyst layer and the position of an outer end of the other catalyst layer are offset from each other in the membrane thickness direction of the solid polymer electrolyte membrane.

For example, as shown in FIG. 17, a membrane electrode assembly disclosed in Japanese Laid-Open Patent Publication No. 2006-338938 (hereinafter referred to as the conventional technique 1) includes a polymer electrolyte membrane 1$a$, a cathode catalyst layer 2$a$ provided on one surface of the polymer electrolyte membrane 1$a$, an anode catalyst layer 3$a$ provided on the other surface of the polymer electrolyte membrane 1$a$, and a first gasket layer 4$a$ formed on at least part of an end of the cathode catalyst layer 2$a$ such that the effective surface area of the anode catalyst layer 3$a$ is larger than the effective surface area of the cathode catalyst layer 2$a$.

Further, a reinforcement layer 5$a$ is provided at a portion where the polymer electrolyte membrane 1$a$ and the end of the cathode catalyst layer 2$a$ are overlapped with each other at least in the thickness direction of the membrane electrode assembly. The reinforcement layer 5$a$ is harder than the polymer electrolyte membrane 1$a$.

Further, as shown in FIG. 18, for example, a solid polymer electrolyte fuel cell disclosed in Japanese Laid-Open Patent Publication No. 2008-135295 (hereinafter referred to as the conventional technique 2) is formed by combining gas diffusion layer elements 1$b$ on both sides of the membrane electrode assembly 2$b$. The membrane electrode assembly 2$b$ includes a polymer electrolyte membrane 3$b$, and catalyst layers 4$b$ are formed on both surfaces of the polymer electrolyte membrane 3$b$.

The gas diffusion layer element 1$b$ includes a sheet like porous base member 5$b$, e.g., made of carbon material having gas-permeable and electrically-conductive property, and sealing resin 6$b$, e.g., made of thermoplastic resin such as polycarbonate based resin. Pores in an outer end of the porous base member 5$b$ are impregnated with the sealing resin 6$b$. Impregnation of the sealing resin 6$b$ is performed by irradiating, with a laser beam, a sealing resin film stacked on the outer end to melt the sealing resin film, whereby a seal area 7$b$ is formed.

SUMMARY OF THE INVENTION

In the conventional technique 1, the membrane electrode assembly is sandwiched between the separators to form a fuel cell, and in use, a plurality of the fuel cells are stacked together to form a fuel cell stack. A predetermined tightening load is applied to the fuel cell stack in the stacking direction to achieve the desired power generation performance and sealing performance.

The outer end (edge area) of the cathode catalyst layer 2$a$ is pressed against the reinforcement layer 5$a$, and the outer end (edge area) of the anode catalyst layer 3$a$ is pressed against the reinforcement layer 5$a$ and the polymer electrolyte membrane 1$a$. Therefore, in the area near each edge area, the pressure applied to the surface (surface pressure) of the reinforcement layer 5$a$ and the polymer electrolyte membrane 1$a$ is increased, so that the thickness thereof is decreased, and the durability is degraded.

Further, in the conventional technique 2, normally, the solid polymer electrolyte fuel cell (MEA) is sandwiched between the separators, and in use, a plurality of the solid polymer electrolyte fuel cells are stacked together to form a fuel cell stack. A predetermined tightening load is applied to the fuel cell stack in the stacking direction to achieve the desired power generation performance and sealing performance.

The Young's modulus of the power generation area (non-impregnation area of the diffusion layer) 8$b$ located inside the seal area 7$b$ is different from the Young's modulus of the impregnation area 9$b$ of the diffusion layer including the seal area 7$b$. That is, the Young's modulus of the impregnation area 9$b$ of the diffusion layer is higher than the Young's modulus of the power generation area 8$b$. Therefore, when a load is applied to the solid polymer electrolyte fuel cell, the impregnation area 9$b$ of the diffusion layer is pressed against the polymer electrolyte membrane 3$b$. Thus, the load applied to the polymer electrolyte membrane 3$b$ is increased in the outer end pressed against the impregnation area 9$b$ of the diffusion layer. As a result, the thickness of the polymer electrolyte membrane 3$b$ is decreased, and thus the durability of the solid polymer electrolyte membrane 3$b$ is degraded.

An object of the present invention is to provide a fuel cell which makes it possible to reliably prevent excessive load from being applied to an outer end of an electrode catalyst layer when components of the fuel cell are tightened together, for preventing damages of a solid polymer electrolyte membrane reliably.

Further, an object of the present invention is to provide a fuel cell which makes it possible to prevent excessive load from being applied to a solid polymer electrolyte membrane disposed in a resin impregnated portion when components of the fuel cell are tightened together, for preventing degradation of the durability of the solid polymer electrolyte membrane reliably.

The present invention relates to a fuel cell including a membrane electrode assembly, and separators provided on both surfaces of the membrane electrode assembly. The membrane electrode assembly includes a first electrode, a second electrode, and a solid polymer electrolyte membrane interposed between the first electrode and the second electrode. Each of the first electrode and the second electrode includes an electrode catalyst layer and a gas diffusion layer.

The membrane electrode assembly includes a power generation area where the solid polymer electrolyte membrane is interposed between the first electrode and the second electrode and an edge area where the solid polymer electrolyte membrane is sandwiched between an outer end of the electrode catalyst layer of the first electrode and an outer end of the electrode catalyst layer of the second electrode. A recess for receiving the edge area is formed on a surface of the separator which contacts the membrane electrode assembly.

Further, the present invention relates to a fuel cell including a membrane electrode assembly, and separators provided on both surfaces of the membrane electrode assembly. The membrane electrode assembly includes a first electrode, a second electrode, and a solid polymer electrolyte membrane interposed between the first electrode and the second electrode. Each of the first electrode and the second electrode includes a gas diffusion layer and a resin impregnated portion impregnated with resin at the other end of the gas diffusion layer. A recess for receiving the resin impregnated portion is formed on a surface of the separator which contacts the membrane electrode assembly.

In the present invention, the separator has the recess corresponding to the edge area of the membrane electrode assembly. In the structure, when the components of the fuel cell are stacked together, the tightening margin in the edge area is smaller than the tightening margin in the power generation area. Therefore, in the power generation area, the surface pressure required for achieving the power generation performance is secured, and at the edge area, it is possible to prevent excessive tightening force from being applied to the outer ends of the electrode catalyst layers. Thus, the desired power generation performance is achieved, and it becomes possible to suppress damages of solid polymer electrolyte membrane at the edge. In the structure, the desired power generation performance is achieved, and it becomes possible to suitably suppress damage to the solid polymer electrolyte membrane at the edge area.

Further, according to the present invention, the separator has the recess corresponding to the resin impregnated portion of the membrane electrode assembly. In the structure, when components of the fuel cell are tightened together, the tightening margin in the resin impregnated portion is smaller than the tightening margin in the power generation area. Thus, in the power generation area, the required surface pressure for achieving the power generation performance is secured, and in the resin impregnated portion, it is possible to prevent excessive tightening force from being applied to the solid polymer electrolyte membrane. As a result, the desired power generation performance is achieved, and it becomes possible to suitably suppress degradation of the durability in the solid polymer electrolyte membrane by the resin impregnated portion.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
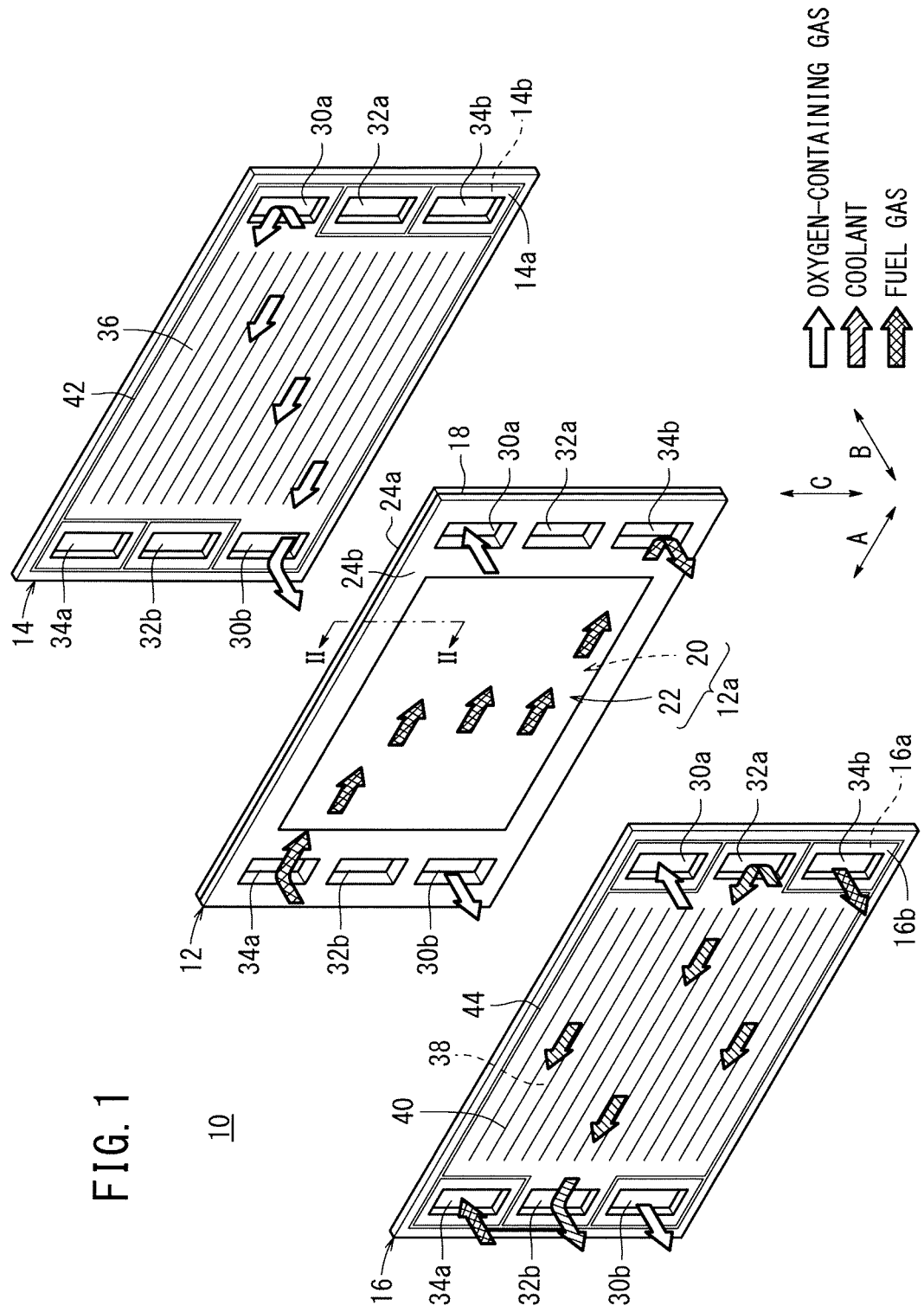
FIG. 1 is an exploded perspective view showing main components of a fuel cell according to a first embodiment of the present invention.
Figure 2:
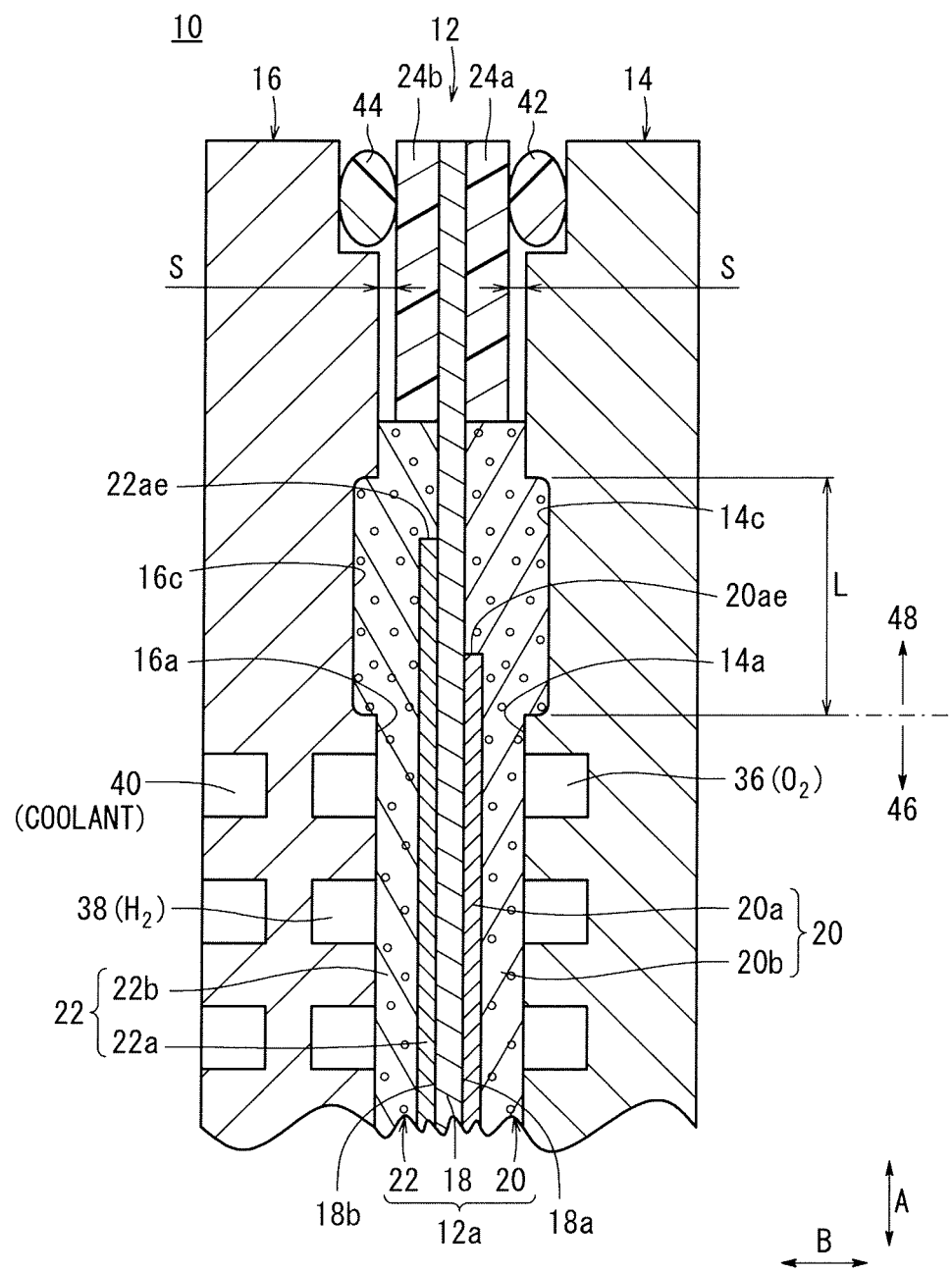
FIG. 2 is a cross sectional view showing the fuel cell, taken along a line II-II in FIG. 1.

As shown in FIGS. 1 and 2, a fuel cell 10 according to a first embodiment of the present invention includes a membrane electrode assembly with a protective film 12, and a cathode-side separator 14 and an anode-side separator 16 sandwiching the membrane electrode assembly with the protective film 12.

For example, the cathode-side separator 14 and the anode-side separator 16 are carbon separators. Instead of the carbon separators, for example, metal thin plates may be used as the cathode-side separator 14 and the anode-side separator 16.

As shown in FIG. 2, the membrane electrode assembly with protective film 12 includes an MEA 12a. For example, the MEA 12a includes a cathode (second electrode) 20, and an anode (first electrode) 22, and a solid polymer electrolyte membrane 18 interposed between the cathode 20 and the anode 22. The solid polymer electrolyte membrane 18 is formed by impregnating a thin membrane of perfluorosulfonic acid with water, for example. A fluorine based electrolyte may be used as the solid polymer electrolyte membrane 18. Alternatively, an HC (hydrocarbon) based electrolyte may be used as the solid polymer electrolyte membrane 18.

The cathode 20 is provided on one surface 18a of the solid polymer electrolyte membrane 18, and the anode 22 is provided on the other surface 18b of the solid polymer electrolyte membrane 18. The outer end of the solid polymer electrolyte membrane 18 extends outward beyond the outer end of the cathode 20 and the outer end of the anode 22.

The cathode 20 includes an electrode catalyst layer 20a joined to the surface 18a of the solid polymer electrolyte membrane 18, and a gas diffusion layer 20b stacked on the electrode catalyst layer 20a. The anode 22 includes an electrode catalyst layer 22a joined to the surface 18b of the solid polymer electrolyte membrane 18, and a gas diffusion layer 22b stacked on the electrode catalyst layer 22a.

The outer end 22ae of the electrode catalyst layer 22a of the anode 22 is dimensioned such that the outer end 22ae protrudes outward beyond the outer end 20ae of the electrode catalyst layer 20a of the cathode 20 in the direction along the electrode surfaces. Conversely, the outer end 20ae of the cathode 20 may protrude outward beyond the outer end 22ae of the anode 22 in the direction along the electrode surfaces.

Each of the electrode catalyst layers 20a, 22a is formed by carbon black supporting platinum particles as catalyst particles. As an ion conductive binder, polymer electrolyte is used. Catalyst paste formed by mixing the catalyst particles uniformly in the solution of this polymer electrolyte is printed, applied, transferred, or sprayed on both surfaces of the solid polymer electrolyte membrane 18 to form the electrode catalyst layers 20a, 22a. For example, each of the gas diffusion layers 20b, 22b comprises a carbon paper. The gas diffusion layers 20b, 22b are terminated at positions outside the outer ends 20ae, 22ae of the electrode catalyst layers 20a, 22a.

Figure 3:
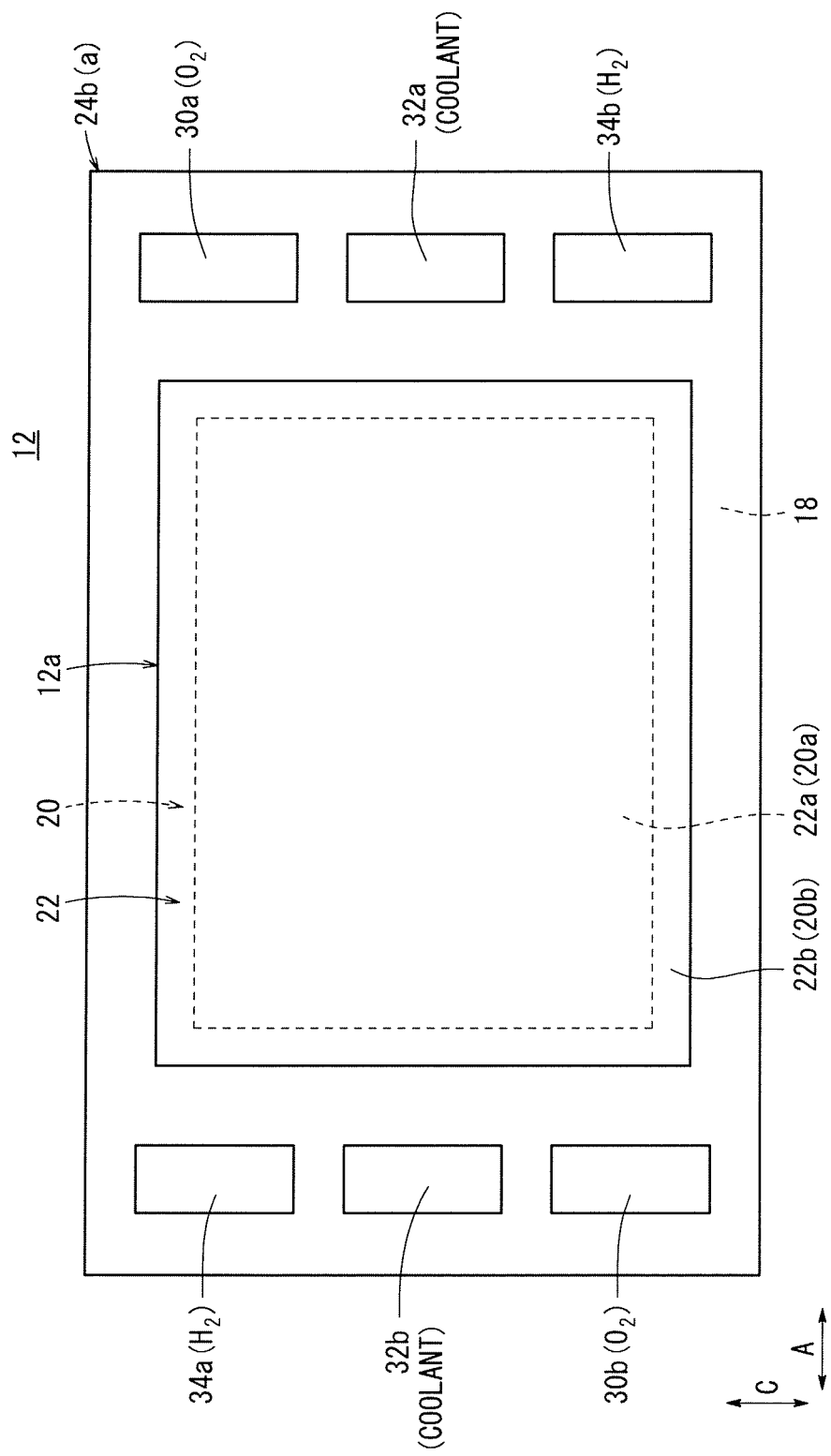
FIG. 3 is a front view showing an anode of a membrane electrode assembly with protective film of the fuel cell.

As shown in FIGS. 1 to 3, the membrane electrode assembly with protective film 12 includes protective film 24a, 24b of resin frame members joined to the outer peripheral end of the surfaces 18a, 18b of the solid polymer electrolyte membrane 18 using adhesive, and joined to front ends of the cathode 20 and the anode 22. For example, the protective films 24a, 24b are made of PPS (polyphenylene sulfide) or PPA (polyphthalamide). Alternatively, the protective films 24a, 24b may be made of resilient polymer material.

As shown in FIG. 2, a recess 14c for receiving an edge-vicinity area (described later) including the outer end 20ae (edge area) is formed in an outer peripheral portion of the cathode-side separator 14 that contacts the MEA 12a. A recess 16c for receiving an edge-vicinity area (described later) including the outer end 22ae (edge area) is formed in an outer peripheral portion of the anode-side separator 16 that contacts the MEA 12a.

In the state where components of the fuel cell 10 are stacked (tightened) together, gaps S are formed respectively between the protective film 24a and the surface 14a of the cathode-side separator 14, and between the protective film 24b and the surface 16b of the anode-side separator 16. The gaps S prevent excessive surface pressure from being applied when the protective films 24a, 24b are directly sandwiched between the cathode-side separator 14 and the anode-side separator 16.

As shown in FIG. 1, at one end of the fuel cell 10 in a horizontal direction indicated by an arrow A, an oxygen-containing gas supply passage 30a for supplying an oxygen-containing gas, a coolant supply passage 32a for supplying a coolant, and a fuel gas discharge passage 34b for discharging a fuel gas such as a hydrogen-containing gas are arranged in a vertical direction indicated by an arrow C. The oxygen-containing gas supply passage 30a, the coolant supply passage 32a, and the fuel gas discharge passage 34b extend through the fuel cell 10 in the direction indicated by the arrow B.

At the other end of the fuel cell 10 in the direction indicated by the arrow A, a fuel gas supply passage 34a for supplying the fuel gas, a coolant discharge passage 32b for discharging the coolant, and an oxygen-containing gas discharge passage 30b for discharging the oxygen-containing gas are arranged in the direction indicated by the arrow C. The fuel gas supply passage 34a, the coolant discharge passage 32b, and the oxygen-containing gas discharge passage 30b extend through the fuel cell 10 in the direction indicated by the arrow B.

The cathode-side separator 14 has an oxygen-containing gas flow field 36 on a surface 14a thereof facing the membrane electrode assembly with protective film 12. The oxygen-containing gas flow field 36 is connected to the oxygen-containing gas supply passage 30a and the oxygen-containing gas discharge passage 30b.

The anode-side separator 16 has a fuel gas flow field 38 on a surface 16a thereof facing the membrane electrode assembly with protective film 12. The fuel gas flow field 38 is connected to the fuel gas supply passage 34a and the fuel gas discharge passage 34b. A coolant flow field 40 is formed between a surface 14b of the cathode-side separator 14 and a surface 16b of the anode-side separator 16. The coolant flow field 40 is connected to the coolant supply passage 32a and the coolant discharge passage 32b.

A first seal member 42 is formed on the surfaces 14a, 14b of the cathode-side separator 14 around the outer end of the cathode-side separator 14. A second seal member 44 is formed on the surfaces 16a, 16b of the anode-side separator 16, around the outer end of the anode-side separator 16.

Each of the first seal member 42 and the second seal members 44 is made of seal material, cushion material, or packing material such as an EPDM (Ethylene Propylene Diene Monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 2, the membrane electrode assembly with protective film 12 includes a power generation area 46 where the solid polymer electrolyte membrane 18 is sandwiched between the cathode 20 and the anode 22, and an edge-vicinity area 48 covering an area including the outer ends 20ae, 22ae of the electrode catalyst layers 20a, 22a. The edge-vicinity area 48 corresponds to an area L where the recess 14c of the cathode-side separator 14 and the recess 16c of the anode-side separator 16 are provided.

Figure 4:
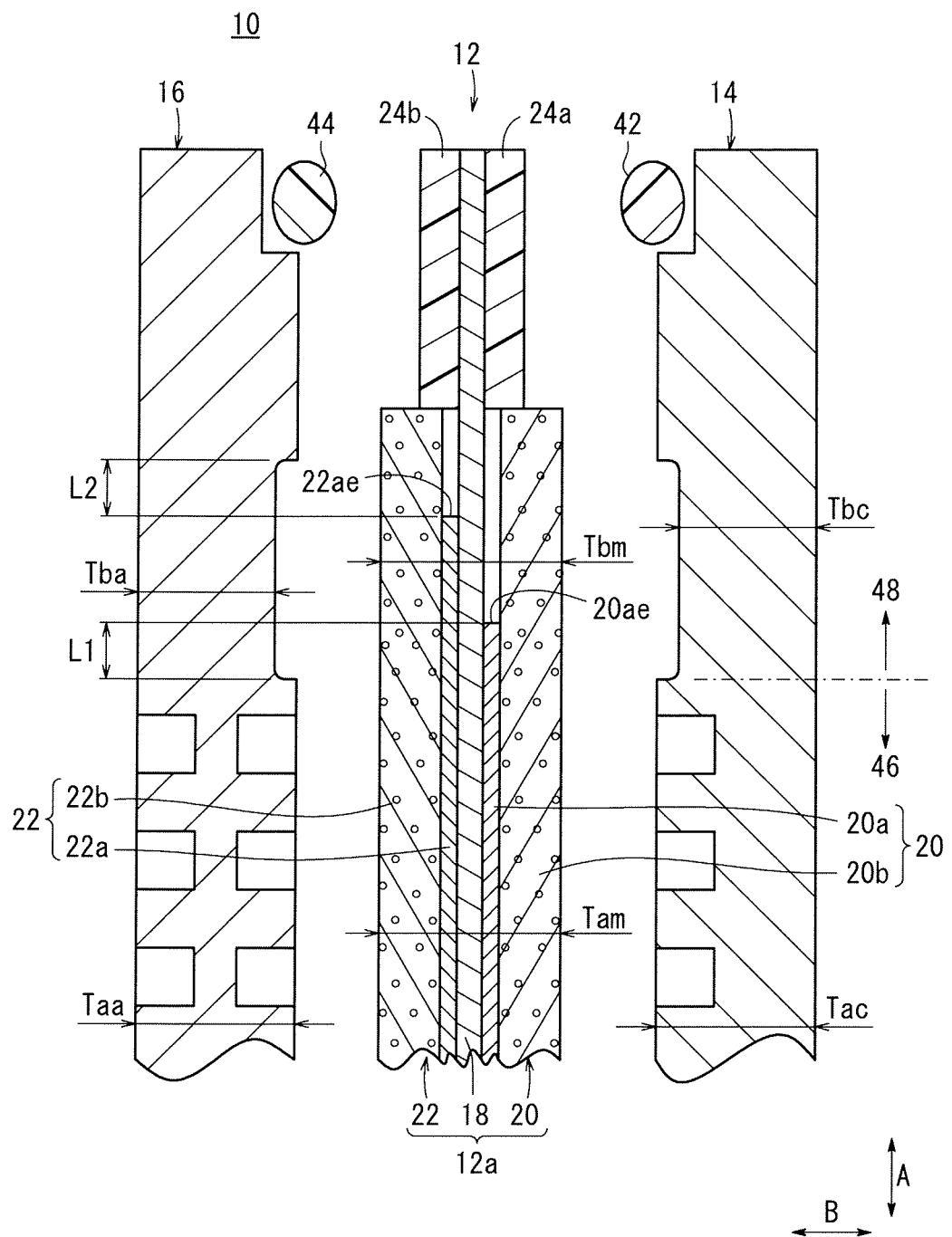
FIG. 4 is a cross sectional view showing main components of the fuel cell before components of the fuel cell are tightened together.

When the components of the fuel cell 10 are stacked together, the tightening margin in the edge-vicinity area 48 is smaller than the tightening margin in the power generation area 46. Specifically, as shown in FIG. 4, before the components of the fuel cell 10 are assembled together, the thickness Tam of the power generation area 46 of the membrane electrode assembly with protective film 12, the thickness Tac of the power generation area 46 of the cathode-side separator 14, the thickness Taa of the power generation area 46 of the anode-side separator 16, the thickness Tbm of the edge-vicinity area 48 of the membrane electrode assembly with protective film 12, the thickness Tbc of the edge-vicinity area 48 of the cathode-side separator 14, and the thickness Tba of the edge-vicinity area 48 of the anode-side separator 16 have the relationship of Tam+Tac+Taa>Tbm+Tbc+Tba.

More preferably, the relationship of Tam×0.8+Tac+Taa>Tbm+Tbc+Tba should be satisfied. Still more preferably, the relationship of Tam×0.6+Tac+Taa>Tbm+Tbc+Tba should be satisfied. When the components of the fuel cell 10 are tightened together, since the fuel cell 10 is compressed under the pressure applied to surfaces of the components (surface pressure), the thickness of the fuel cell 10 including the power generation area 46 (cell thickness) becomes the same as the thickness of fuel cell 10 including the edge-vicinity area 48.

In the edge-vicinity area 48, the distance L1 from the outer end 20*ae* of the cathode 20 having the shorter length to the inner ends of the recesses 14*c*, 16*c* and the distance L2 from the outer end 22*ae* of the anode 22 having the longer length to the outer ends of the recesses 14*c*, 16*c* are determined. The distances L1, L2 are preferably 0.1 mm or more, more preferably 0.4 mm or more, and still more preferably, 2 mm or more.

Operation of the fuel cell 10 will be described below.

Firstly, as shown in FIG. 1, an oxygen-containing gas is supplied to the oxygen-containing gas supply passage 30*a*, and a fuel gas such as a hydrogen containing gas is supplied to the fuel gas supply passage 34*a*. Further, a coolant such as pure water, ethylene glycol, or oil is supplied to the coolant supply passage 32*a*.

Thus, the oxygen-containing gas flows from the oxygen-containing gas supply passage 30*a* into the oxygen-containing gas flow field 36 of the cathode-side separator 14. The oxygen-containing gas moves in the direction indicated by the arrow A, and the oxygen-containing gas is supplied to the cathode 20 of the MEA 12*a* for inducing an electrochemical reaction at the cathode 20. In the meanwhile, the fuel gas flows from the fuel gas supply passage 34*a* into the fuel gas flow field 38 of the anode-side separator 16. The fuel gas moves in the direction indicated by the arrow A along the fuel gas flow field 38, and the fuel gas is supplied to the anode 22 of the MEA 12*a* for inducing an electrochemical reaction at the anode 22.

Thus, in each of the MEAS 12*a*, the oxygen-containing gas supplied to the cathode 20, and the fuel gas supplied to the anode 22 are consumed in the electrochemical reactions at catalyst layers of the cathode 20 and the anode 22 for generating electricity.

The oxygen-containing gas consumed at the cathode 20 is discharged along the oxygen-containing gas discharge passage 30*b* in the direction indicated by the arrow B. Likewise, the fuel gas consumed at the anode 22 is discharged along the fuel gas discharge passage 34*b* in the direction indicated by the arrow B.

Further, the coolant supplied to the coolant supply passage 32*a* flows into the coolant flow field 40 between the cathode-side separator 14 and the anode-side separator 16, and then, flows in the direction indicated by the arrow A.

After the coolant cools the MEA 12*a*, the coolant is discharged from the coolant discharge passage 32*b*.

In the first embodiment, as shown in FIG. 2, the cathode-side separator 14 has the recess 14*c* for receiving the edge-vicinity area 48 including the outer end 20*ae* of the cathode 20. Likewise the anode-side separator 16 has the recess 16*c* for receiving the edge-vicinity area 48 including the outer end 22*ae* of the anode 22.

In this regard, as shown in FIG. 4, before the components of the fuel cell 10 are stacked together, the relationship of Tam+Tac+Taa>Tbm+Tbc+Tba is satisfied. More preferably, the relationship of Tam×0.8+Tac+Taa>Tbm+Tbc+Tba is satisfied. Still more preferably, the relationship of Tam×0.6+Tac+Taa>Tbm+Tbc+Tba is satisfied.

Figure 5:
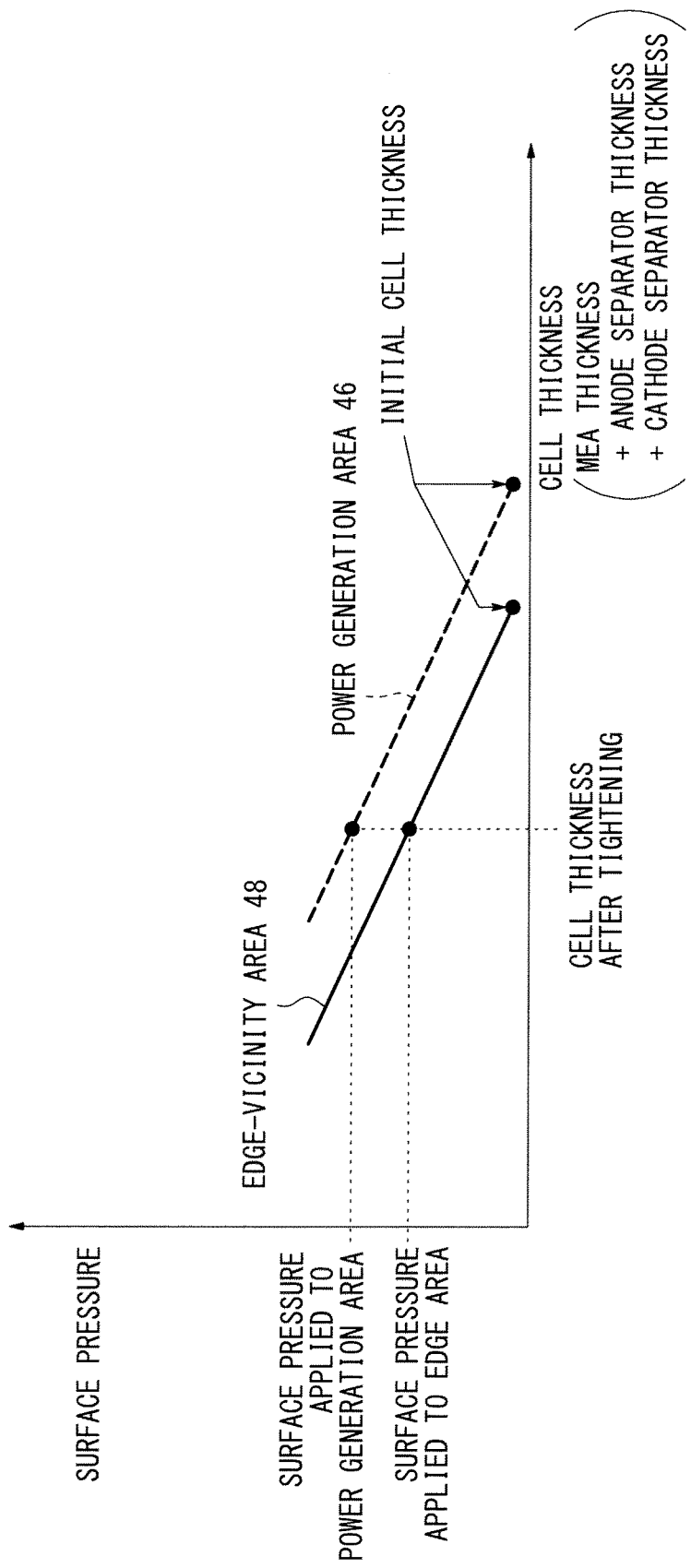
FIG. 5 is a graph showing a relationship between the cell thickness, the surface pressure applied to a power generation area, and the surface pressure applied to an edge area.

In the structure, in the solid polymer electrolyte membrane 18, after the components of the fuel cell 10 are tightened together, the surface pressure applied to the power generation area becomes larger than the surface pressure applied to the edge area. That is, as shown in FIG. 5, based on the relationship between the thickness of the fuel cell 10 (cell thickness) and the surface pressures, the cell thickness after tightening, corresponding to a desired surface pressure applied to the power generation area and a desired surface pressure applied to the edge area is calculated.

Therefore, when the components of the fuel cell 10 are tightened together, the tightening margin in the edge-vicinity area 48 is smaller than the tightening margin in the power generation area 46. Thus, in the power generation area 46, the surface pressure required for maintaining the power generation performance is achieved, and in the edge-vicinity area 48, it is possible to prevent excessive tightening force from being applied to the outer ends 20*ae*, 22*ae* of the electrode catalyst layers 20*a*, 22*a*.

Thus, it becomes possible to achieve the desired power generation performance, and desirably suppress damage to the solid polymer electrolyte membrane 18 caused by the edge areas, i.e., the outer ends 20*ae*, 22*ae*. In particular, as shown in FIG. 4, the distances L1, L2 are preferably 0.1 mm or more, more preferably 0.4 mm or more, and still more preferably, 2 mm or more. Thus, the damages of the solid polymer electrolyte membrane 18 are suppressed as much as possible.

Figure 6:
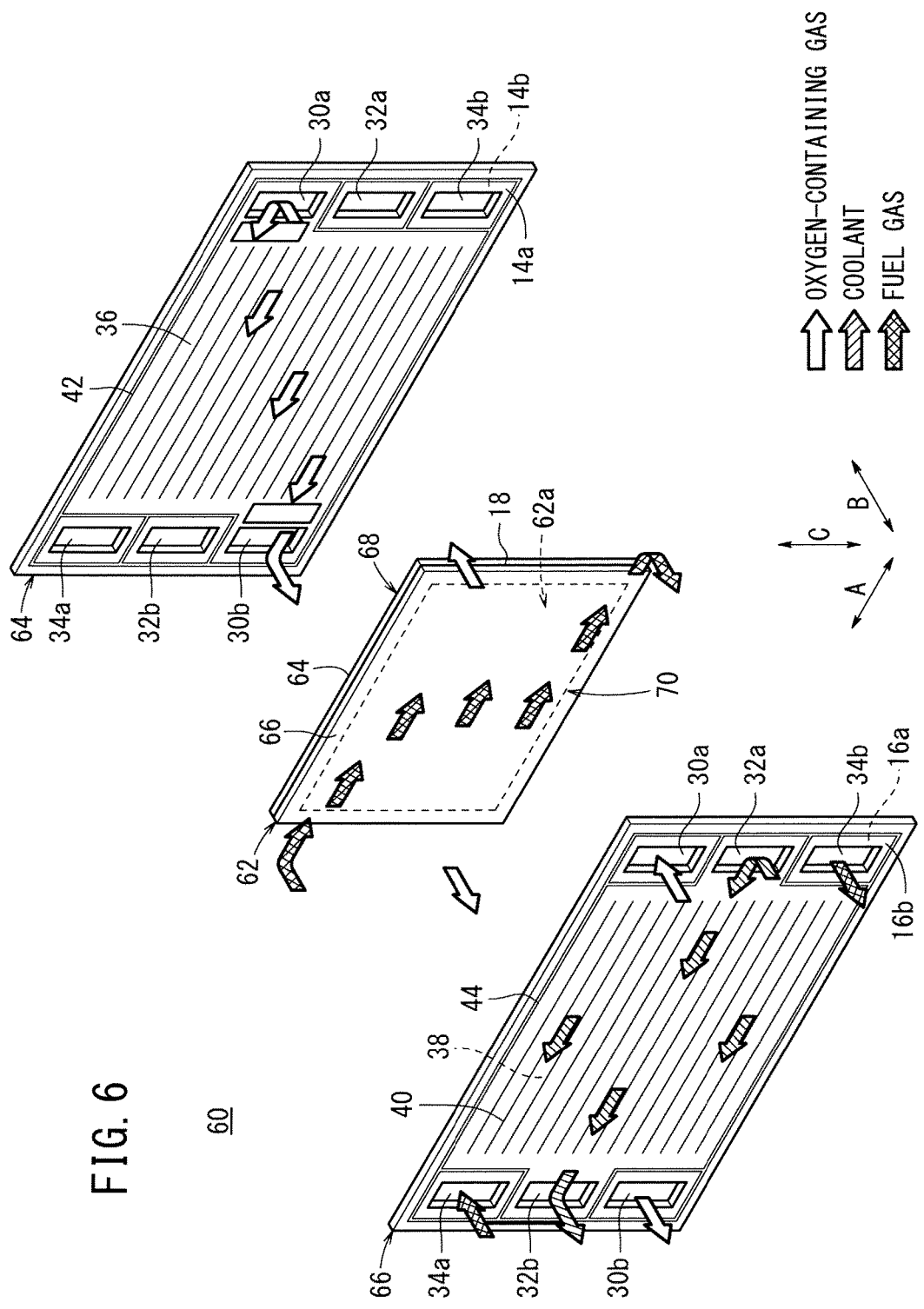
FIG. 6 is an exploded perspective view showing main components of a fuel cell according to a second embodiment of the present invention.

FIG. 6 is an exploded perspective view showing main components of a fuel cell 60 according to a second embodiment of the present invention. The constituent elements that are identical to those of the fuel cell 10 according to the first embodiment are labeled with the same reference numerals, and descriptions thereof will be omitted. Also in third to fifth embodiments as described later, the constituent elements that are identical to those of the fuel cell 10 according to the first embodiment are labeled with the same reference numerals, and descriptions thereof will be omitted.

The fuel cell 60 includes a membrane electrode assembly with protective film 62, and a cathode-side separator 64 and an anode-side separator 66 sandwiching the membrane electrode assembly with protective film 62.

Figure 7:
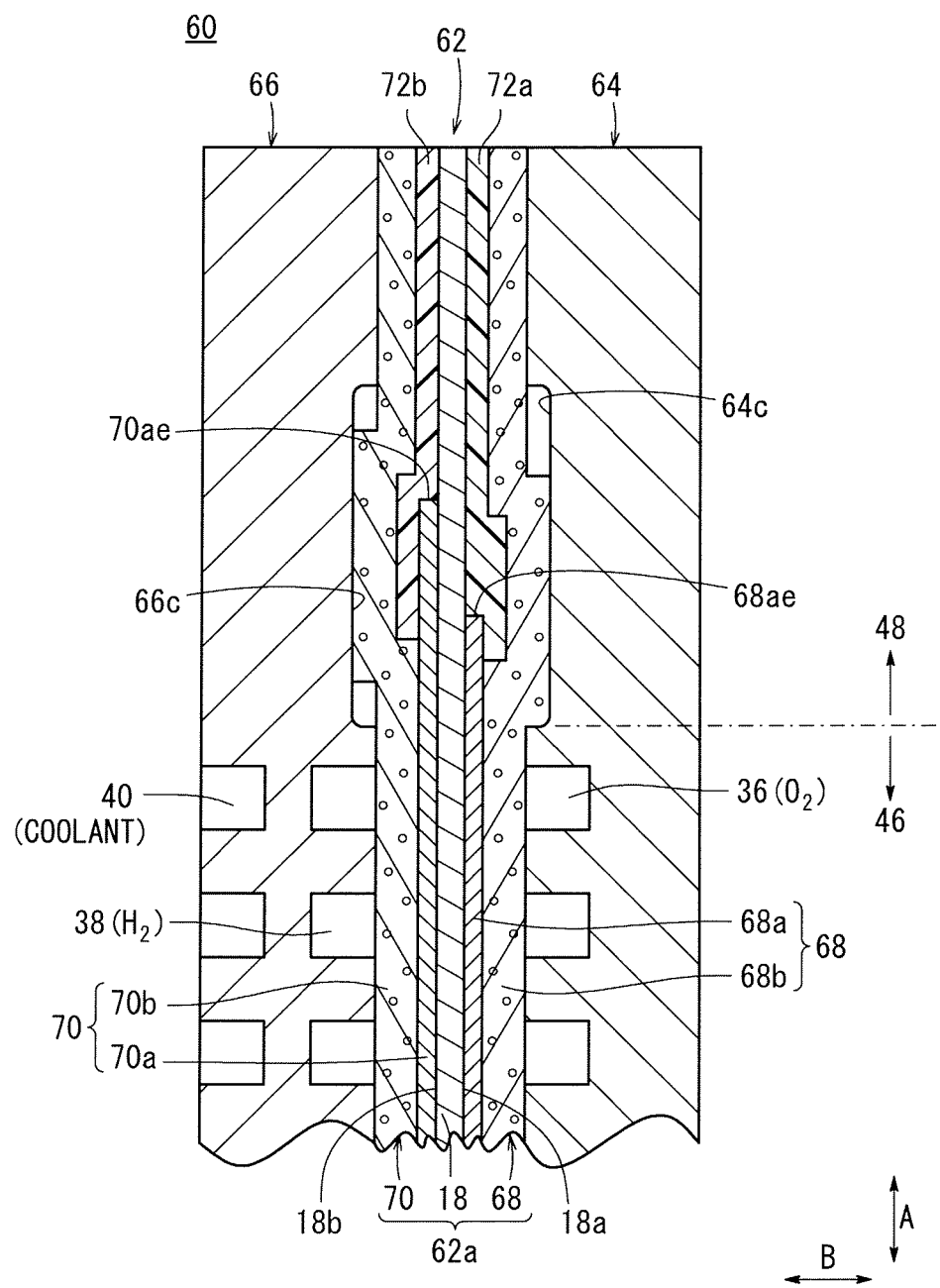
FIG. 7 is a cross sectional view showing main components of the fuel cell.

As shown in FIG. 7, the membrane electrode assembly with protective film 62 includes an MEA 62*a*. The MEA 62*a* includes a cathode (second electrode) 68, an anode (first electrode) 70, and a solid polymer electrolyte membrane 18 interposed between the cathode 68 and the anode 70.

The cathode 68 includes an electrode catalyst layer 68*a* and a gas diffusion layer 68*b*. The anode 70 includes an electrode catalyst layer 70*a* and a gas diffusion layer 70*b*. The outer dimensions of the electrode catalyst layers 68*a*, 70*a* are smaller than the outer dimension of the solid polymer electrolyte membrane 18. The outer dimensions of the gas diffusion layers 68b, 70b are the same as the outer dimension of the solid polymer electrolyte membrane 18.

The outer end 70ae of the electrode catalyst layer 70a of the anode 70 protrudes outward beyond the outer end 68ae of the electrode catalyst layer 68a of the cathode 68 in the direction along the electrode surfaces. Conversely, the outer end 68ae of the cathode 68 may protrude outward beyond the outer end 70ae of the anode 70 in the direction along the electrode surfaces.

The membrane electrode assembly with protective film 62 includes protective films 72a, 72b of resin frame members. The protective films 72a, 72b are joined between both surfaces 18a, 18b of the solid polymer electrolyte membrane 18 and the gas diffusion layers 68b, 70b, and inner edges of the protective films 72a, 72b are joined between the electrode catalyst layers 68a, 70a and the gas diffusion layers 68b, 70b.

A recess 64c for receiving an edge-vicinity area 48 including the outer end 68ae (edge area) is formed in an outer peripheral portion of the cathode-side separator 64 which contacts the MEA 62a. A recess 66c for receiving an edge-vicinity area 48 including the outer end 70ae (edge area) is formed in an outer peripheral portion of the anode-side separator 66 which contacts the MEA 62a.

Figure 8:
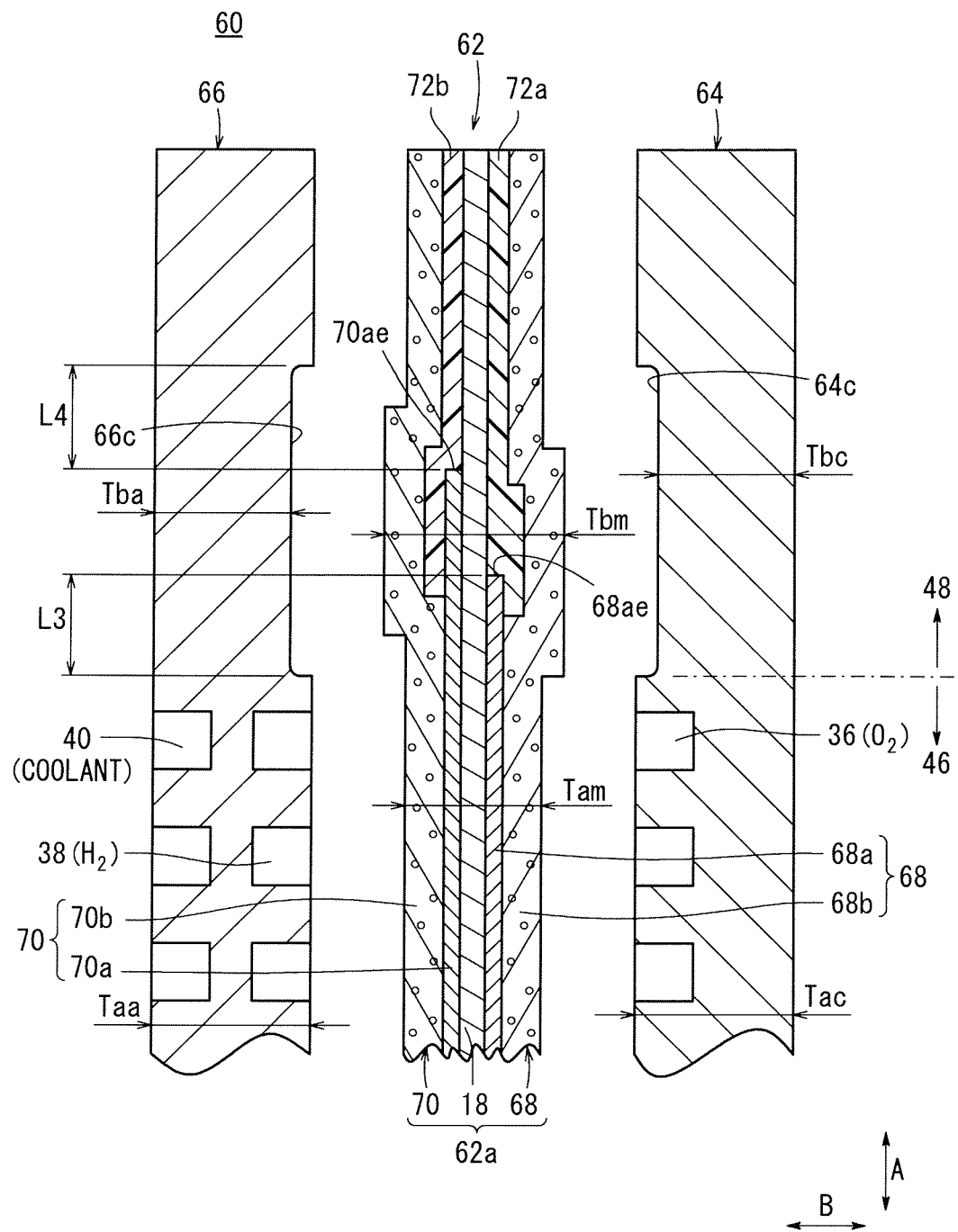
FIG. 8 is a cross sectional view showing main components of the fuel cell before components of the fuel cell are tightened together.

As shown in FIG. 8, before components of the fuel cell 60 are assembled together, the thickness Tam of the power generation area 46 of the membrane electrode assembly with protective film 62, the thickness Tac of the power generation area 46 of the cathode-side separator 64, the thickness Taa of the power generation area 46 of the anode-side separator 66, the thickness Tbm of the edge-vicinity area 48 of the membrane electrode assembly with protective film 62, the thickness Tbc of the edge-vicinity area 48 of the cathode-side separator 64, and the thickness Tba of the edge-vicinity area 48 of the anode-side separator 66 have the relationship of Tam+Tac+Taa>Tbm+Tbc+Tba.

More preferably, the relationship of Tam×0.8+Tac+Taa>Tbm+Tbc+Tba should be satisfied. Still more preferably, the relationship of Tam×0.6+Tac+Taa>Tbm+Tbc+Tba should be satisfied. When the components of the fuel cell 60 are tightened together, the thickness of the fuel cell 60 including the power generation area 46 (cell thickness) becomes the same as the thickness of fuel cell 60 including the edge-vicinity area 48 (cell thickness).

In the edge-vicinity area 48, the distance L3 from the outer end 68ae of the cathode 68 having the shorter length to the inner ends the recesses 64c, 66c and the distance L4 from the outer end 70ae of the anode 70 having the longer length to the outer ends of the recesses 64c, 66c are determined. The distances L3, L4 are preferably 0.1 mm or more, more preferably 0.4 mm or more, and still more preferably, 2 mm or more.

In the second embodiment, as shown in FIG. 7, the recess 64c for receiving the edge-vicinity area 48 is provided in the cathode-side separator 64, and the recess 66c for receiving the edge-vicinity area 48 is provided in the anode-side separator 66. In the structure, the same advantages as in the case of the first embodiment are obtained. For example, it becomes possible to achieve the desired power generation performance, and desirably suppress damage to the solid polymer electrolyte membrane 18 caused by the edge areas, i.e., the outer ends 68ae, 70ae.

Figure 9:
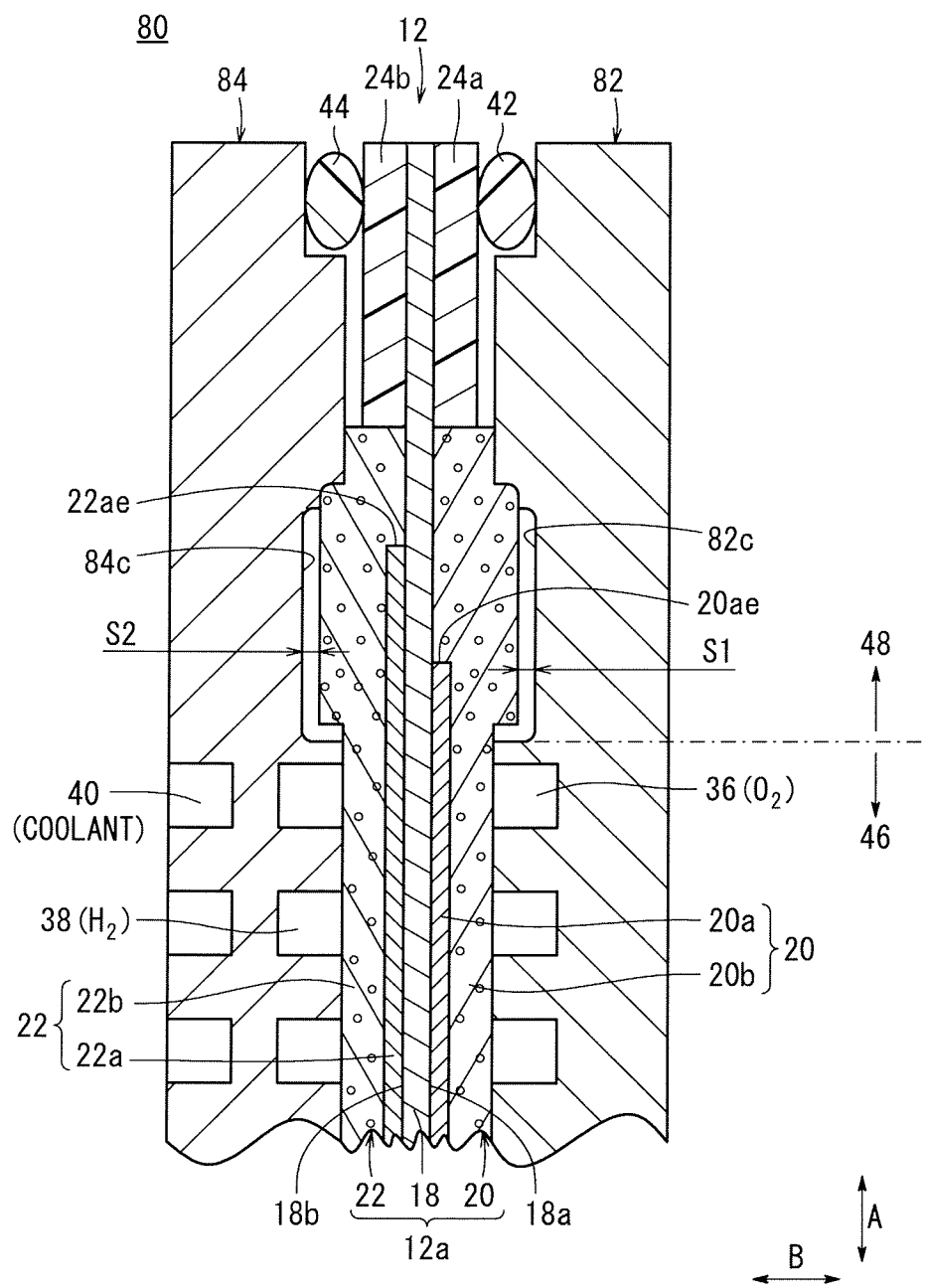
FIG. 9 is a cross sectional view showing main components of a fuel cell according to a third embodiment of the present invention.

FIG. 9 is a cross sectional view showing main components of a fuel cell 80 according to a third embodiment of the present invention.

The fuel cell 80 includes a membrane electrode assembly with protective film 12, and a cathode-side separator 82 and an anode-side separator 84 sandwiching the membrane electrode assembly with protective film 12.

A recess 82c for receiving an edge-vicinity area 48 including an outer end 20ae is provided in an outer peripheral portion of the cathode-side separator 82 which contacts the MEA 12a. A recess 84c for receiving an edge-vicinity area 48 including an outer end 22ae is provided in an outer peripheral portion of the anode-side separator 84 which contacts the MEA 12a. When the components of the fuel cell 80 are tightened together, a gap S1 is formed between an inner wall surface of the recess 82c and the gas diffusion layer 20b, and a gap S2 is formed between an inner wall surface of the recess 84c and the gas diffusion layer 22b.

In the third embodiment, the same advantages as in the case of the first and second embodiments are obtained. For example, it becomes possible to achieve the desired power generation performance, and desirably suppress damage to the solid polymer electrolyte membrane 18 caused by the edge area, i.e., the outer ends 20ae, 22ae.

Figure 10:
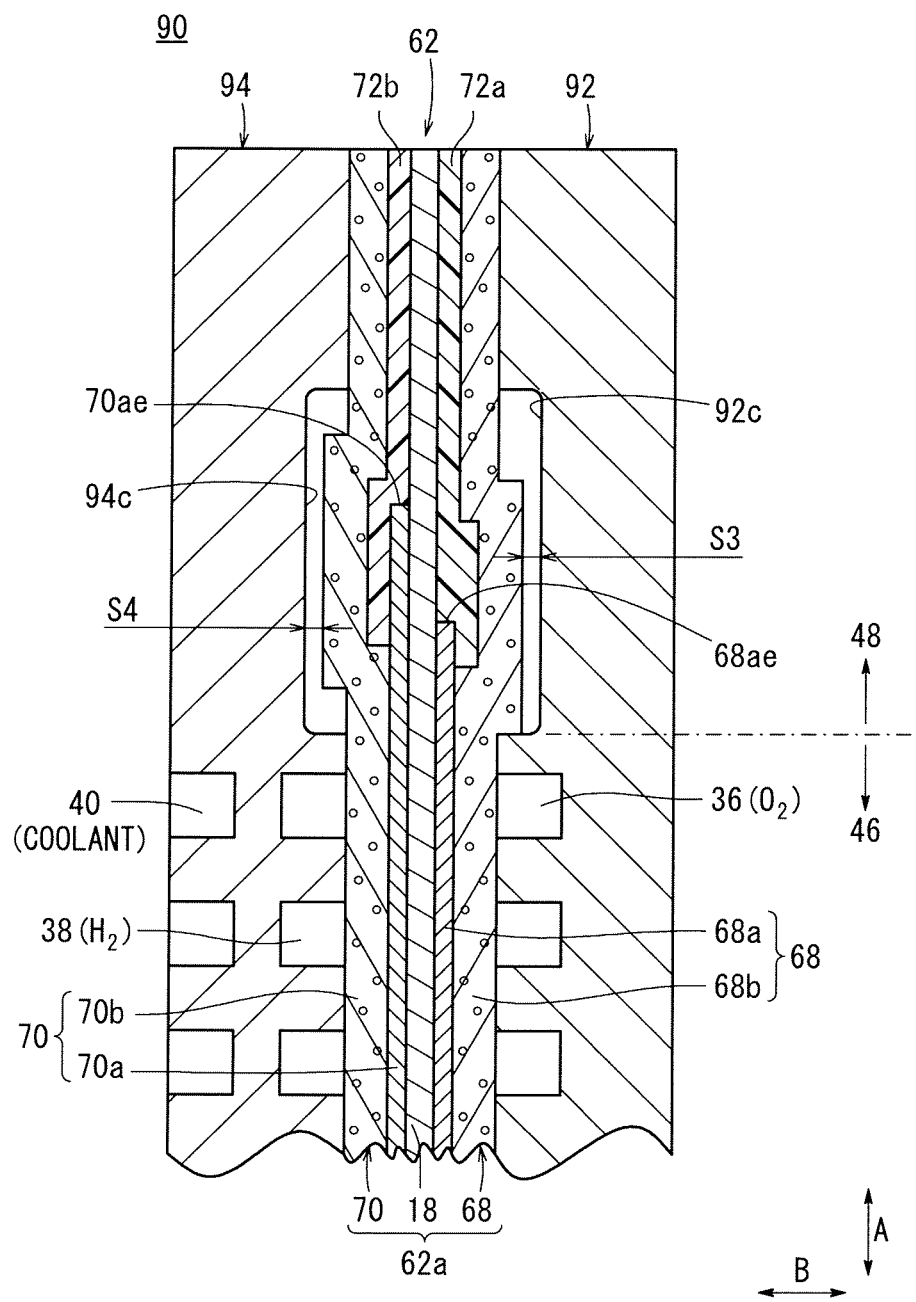
FIG. 10 is a cross sectional view showing main components of a fuel cell according to a fourth embodiment of the present invention.

FIG. 10 is a cross sectional view showing main components of a fuel cell 90 according to a fourth embodiment of the present invention.

The fuel cell 90 includes a membrane electrode assembly with protective film 62 and a cathode-side separator 92 and an anode-side separator 94 sandwiching the membrane electrode assembly with protective film 62.

A recess 92c for receiving an edge-vicinity area 48 including an outer end 68ae is provided in an outer peripheral portion of the cathode-side separator 92 which contacts the MEA 62a. A recess 94c for receiving an edge-vicinity area 48 including an outer end 70ae is provided in an outer peripheral portion of the anode-side separator 94 which contacts the MEA 62a. When the components of the fuel cell 90 are tightened together, a gap S3 is formed between an inner wall surface of the recess 92c and the gas diffusion layer 68b, and a gap S4 is formed between an inner wall surface of the recess 94c and the gas diffusion layer 70b.

In the fourth embodiment, the same advantages as in the case of the first to third embodiments are obtained. For example, it becomes possible to achieve the desired power generation performance, and desirably suppress damage to the solid polymer electrolyte membrane 18 caused by the edge area, i.e., the outer ends 68ae, 70ae.

Figure 11:
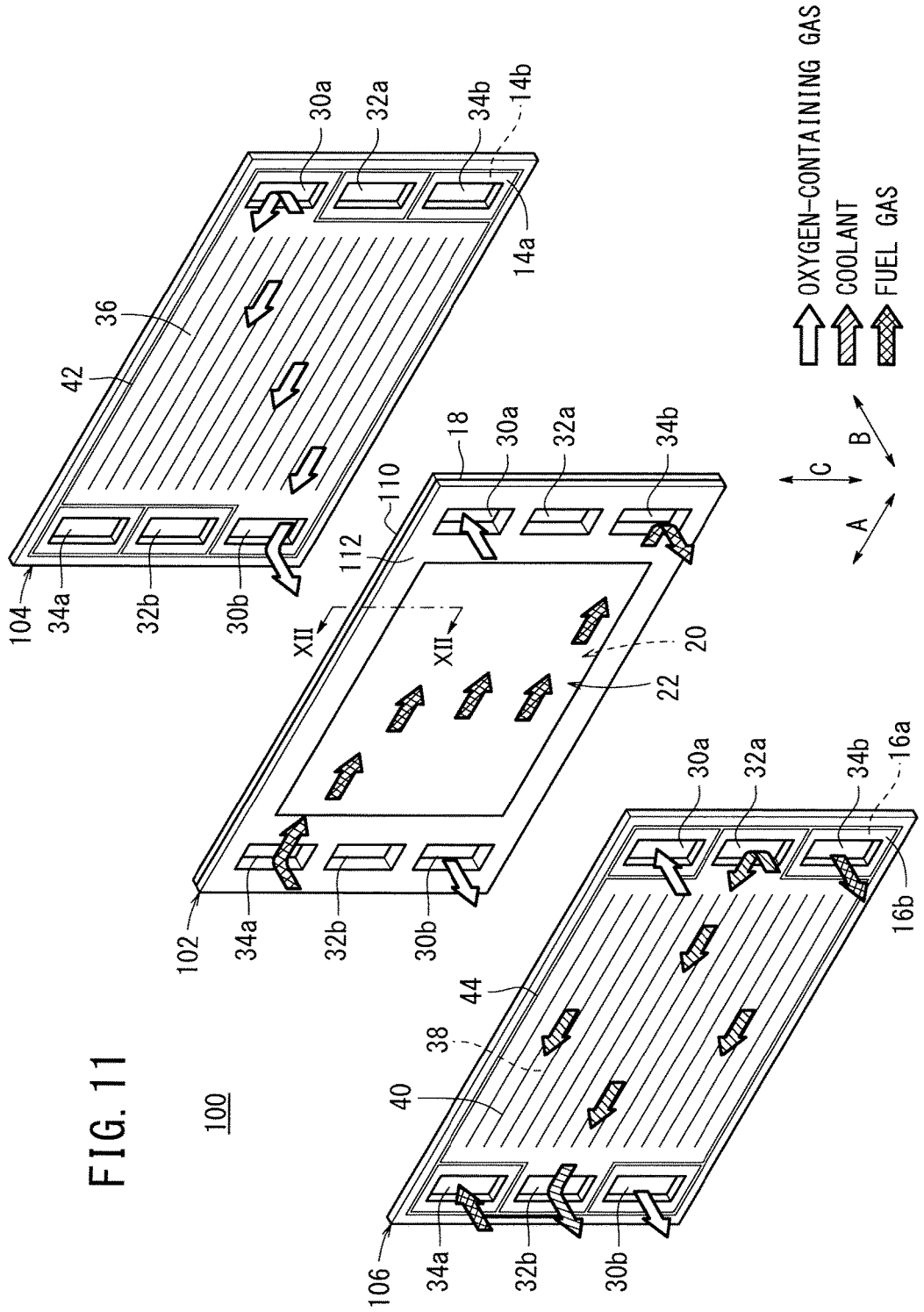
FIG. 11 is a perspective view showing main components of a fuel cell according to a fifth embodiment of the present invention.

FIG. 11 is an exploded perspective view showing main components of a fuel cell 100 according to a fifth embodiment of the present invention.

The fuel cell 100 includes a membrane electrode assembly 102, and a cathode-side separator 104 and an anode-side separator 106 sandwiching the membrane electrode assembly 102.

Figure 12:
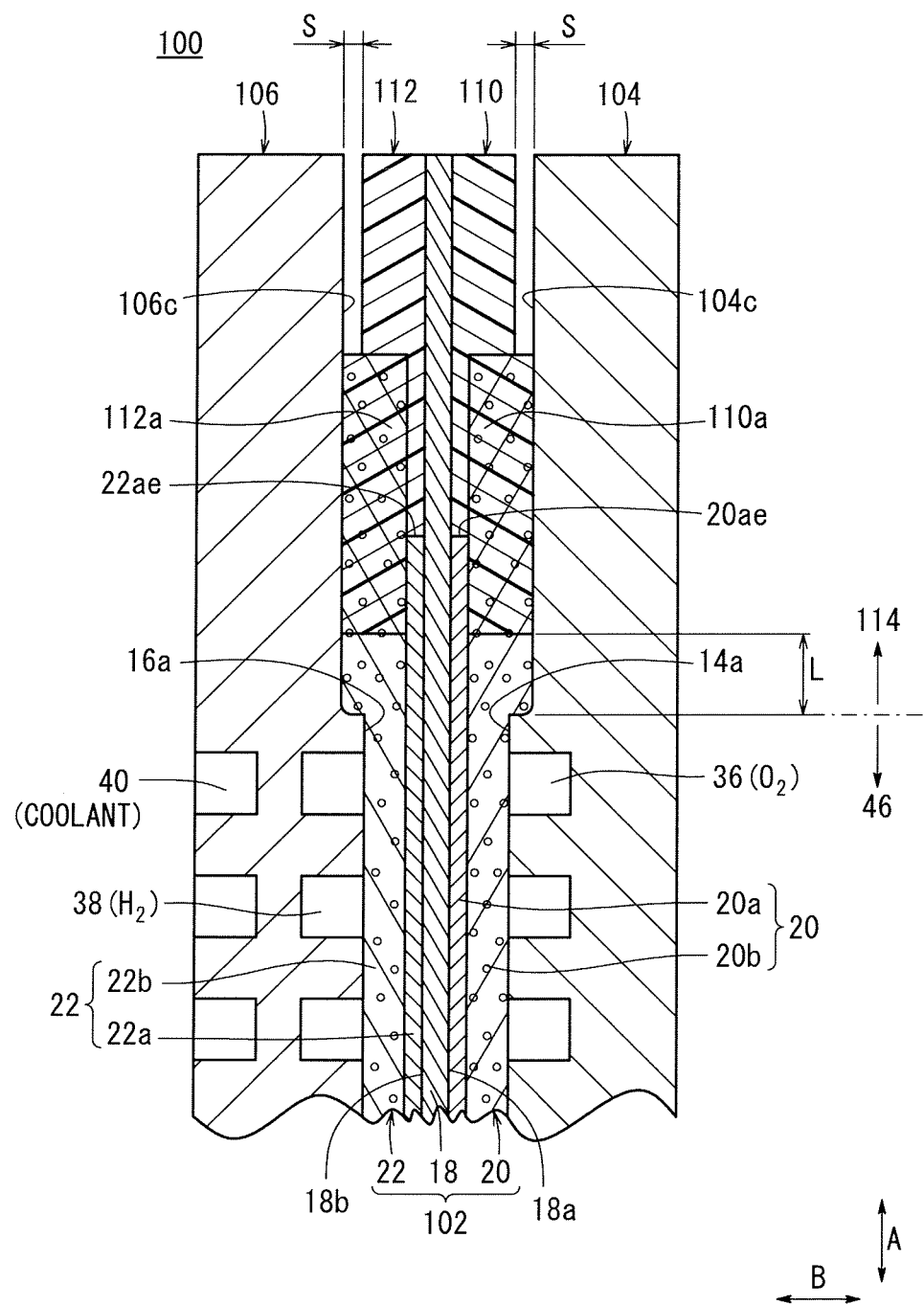
FIG. 12 is a cross sectional view showing the fuel cell, taken along a line XII-XII in FIG. 11.

As shown in FIG. 12, an outer end 20ae of the electrode catalyst layer 20a of the cathode 20 and an outer end 22ae of the electrode catalyst layer 22a of the anode 22 are terminated at the same position. The outer end 20ae and the outer end 22ae may be terminated at different positions.

Figure 13:
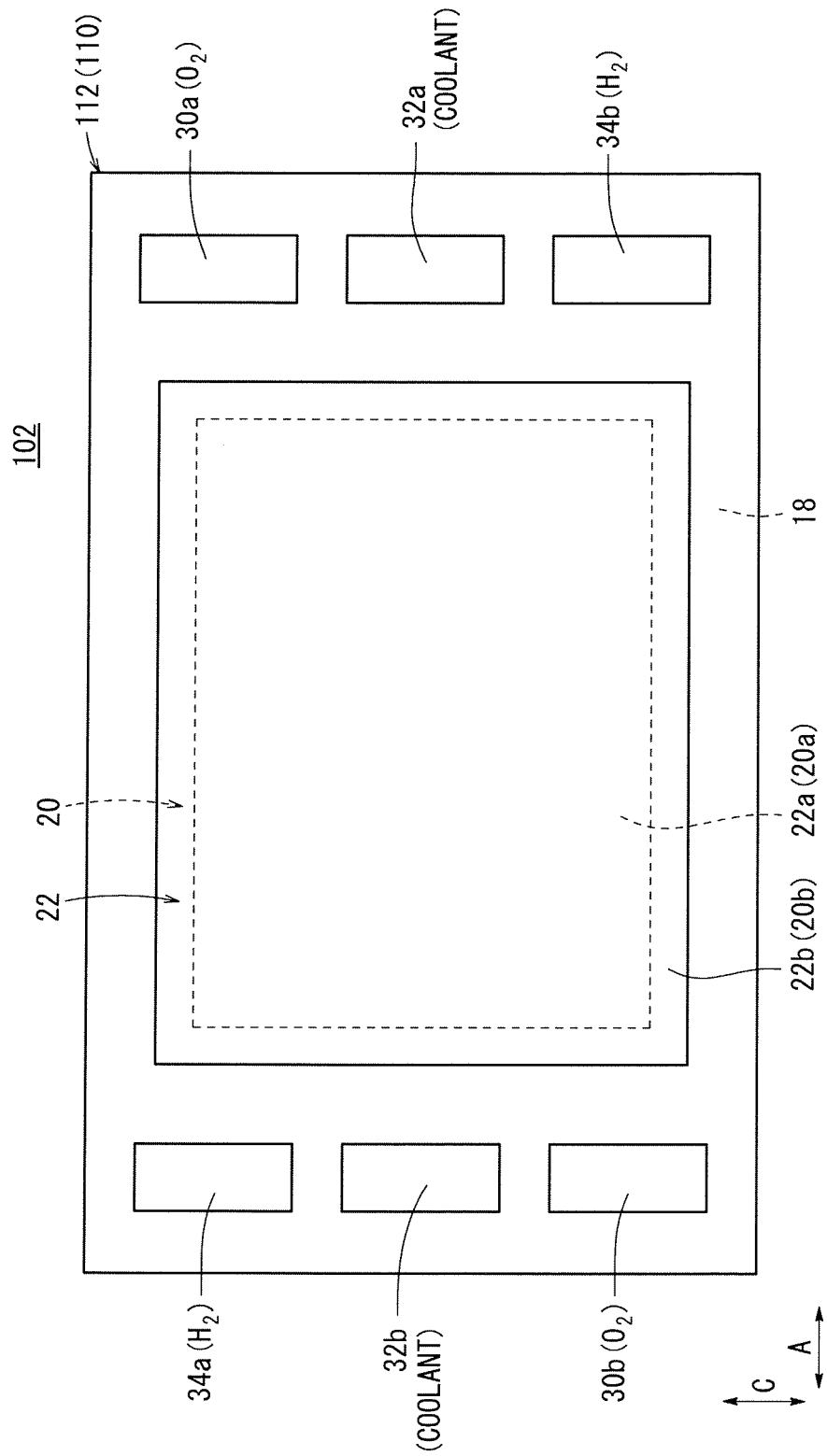
FIG. 13 is a front view showing an anode of a membrane electrode assembly of the fuel cell.

As shown in FIGS. 11 to 13, the membrane electrode assembly 102 includes frame-shaped resin members 110, 112 for impregnation (hereinafter simply referred to as the resin members 110, 112). The resin members 110, 112 are joined to outer portions on the surfaces 18a, 18b of the solid polymer electrolyte membrane 18. The front ends of the cathode 20 and the anode 22 are impregnated with resin of the resin members 110, 112.

The resin members 110, 112 include resin impregnated portions 110a, 112a where outer end portions of the gas diffusion layers 20b, 22b are impregnated with resin so as to extend to the inside of the outer ends of the electrode catalyst layers 20a, 22a, so that the electrode catalyst layers 20a, 22a are overlapped with the resin impregnated portions 110a, 112a. For example, resin material such as PVDF (polyvinylidene fluoride) or PPS (polyphenylene sulfide) may be used for the resin members 110, 112.

As shown in FIG. 12, a recess 104c for receiving an impregnation area (described later) including the resin impregnated portion 110a is provided in an outer peripheral portion of the cathode-side separator 104 which contacts the membrane electrode assembly 102. A recess 106c for receiving an impregnation area (described later) including a resin impregnated portion 112a is provided in an outer peripheral portion of the anode-side separator 106 which contacts the membrane electrode assembly 102. The inner end faces of the recesses 104c, 106c are spaced from the inner ends of the resin impregnated portions 110a, 112a by a distance L.

When the components of the fuel cell 100 are stacked together (tightened together), a gap S is formed outside the gas diffusion layers 20b, 22b, between the resin members 110, 112 and the cathode-side separator 104 and the anode-side separator 106. Preferably, the gap S on the cathode side and the gap S on the anode side have the same size.

By providing the gaps S, it is possible to prevent bending between the power generation area and the surrounding area in the membrane electrode assembly 102. Further, it is possible to prevent excessively-high surface pressure from being applied to the components when the resin members 110, 112 are directly sandwiched between the cathode-side separator 104 and the anode-side separator 106.

The outer ends of the resin members 110, 112 and the outer end of the solid polymer electrolyte membrane 18 may be terminated at the same position as the outer ends of the gas diffusion layers 20b, 22b. Further, seals may be provided between the outer portions of the gas diffusion layers 20b, 22b and the cathode-side separator 104 and the anode-side separator 106.

As shown in FIG. 12, the membrane electrode assembly 102 includes a power generation area 46 where the solid polymer electrolyte membrane 18 is sandwiched between the cathode 20 and the anode 22, and an impregnation area 114 covering an area including the resin impregnated portions 110a, 112a. At the border between the power generation area 46 and the impregnation area 114, the stepped portions of the cathode-side separator 104 and the anode-side separator 106 may be rounded.

Figure 14:
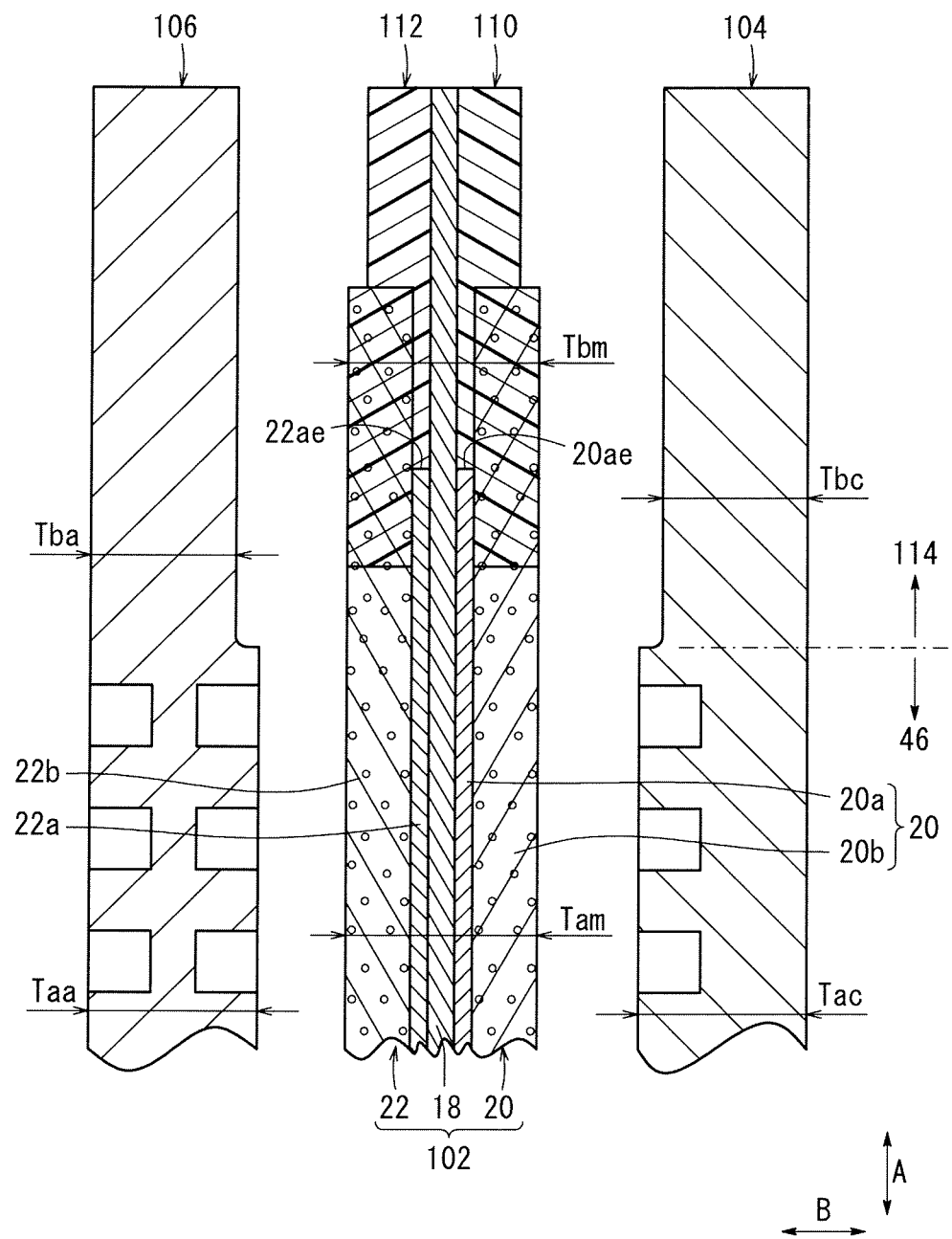
FIG. 14 is a partial cross sectional view showing the membrane electrode assembly, a cathode-side separator, and an anode-side separator before these components are tightened together.

In the fuel cell 100, when the components of the fuel cell 100 are stacked together, the tightening margin in the impregnation area 114 is smaller than the tightening margin in the power generation area 46. Specifically, as shown in FIG. 14, before the components of the fuel cell 100 are assembled, the thickness Tam of the power generation area 46 of the membrane electrode assembly 102, the thickness Tac of the power generation area 46 of the cathode-side separator 104, the thickness Taa of the power generation area 46 of the anode-side separator 106, the thickness Tbm of the impregnation area 114 of the membrane electrode assembly 102, the thickness Tbc of the impregnation area of the cathode-side separator 104, and the thickness Tba of the impregnation area 114 of the anode-side separator 106 have the relationship of Tam+Tac+Taa>Tbm+Tbc+Tba.

More preferably, in consideration of the cell thickness Tcell when the components of the fuel cell 100 are tightened together, the Young's modulus Ea of the gas diffusion layers 20b, 22b in the power generation area 46 when the components of the fuel cell 100 are tightened together, and the Young's modulus Eb of the gas diffusion layers 20b, 22b in the resin impregnated portions 110a, 112a when the components of the fuel cell 10 are tightened together, the relationship of Tam+Tac+Taa−Tcell>(Tbm+Tbc+Tba−Tcell)×Eb/Ea is satisfied.

Next, a method of producing the membrane electrode assembly 102 will be described below.

Figure 15:
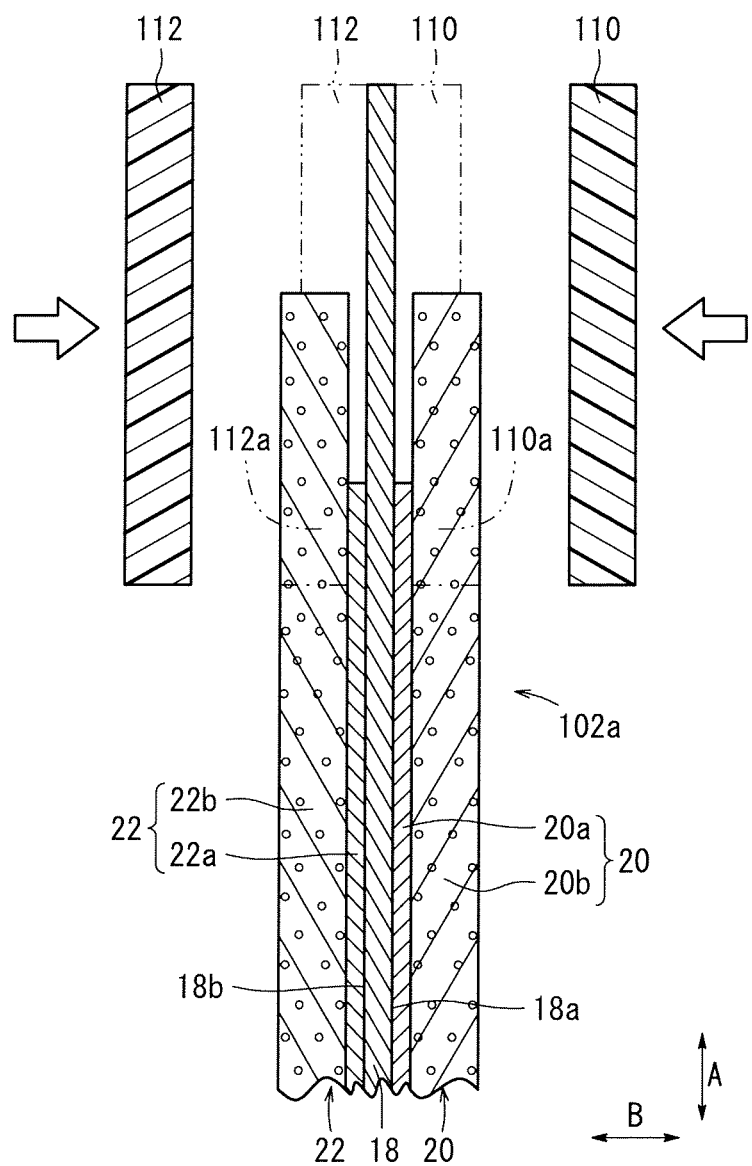
FIG. 15 is a cross sectional view showing a method of producing the membrane electrode assembly.

Firstly, as shown in FIG. 15, the membrane electrode assembly 102 is fabricated. Specifically, the electrode catalyst layers 20a, 22a are coated on both surface 18a, 18b of the solid polymer electrolyte membrane 18. The gas diffusion layer 20b is provided on the surfaces 18a of the solid polymer electrolyte membrane 18, i.e., on the electrode catalyst layer 20a, and the gas diffusion layer 22b is provided on the surface 18b of the solid polymer electrolyte membrane 18, i.e., on the electrode catalyst layer 22a. These components are stacked together, and subjected to hot pressing to fabricate a membrane electrode assembly element 102a.

Then, the resin members 110, 112 are provided on the membrane electrode assembly element 102a. The resin members 110, 112 extend from the outer end of the solid polymer electrolyte membrane 18 to the inside of the outer portions of the gas diffusion layers 20b, 22b, and further extend to the inside of the outer ends of the electrode catalyst layers 20a, 22a.

In the state where a load is applied to the resin members 110, 112, for example, the resin members 110, 112 are melted by heat, using laser welding, infrared-ray welding, impulse welding or the like. Thus, the outer portions of the gas diffusion layers 20b, 22b are impregnated with the melted resin of the resin members 110, 112 which extend to the inside of the outer ends of the electrode catalyst layers 20a, 22a, to form the resin impregnated portions 110a, 112a. In this manner, the membrane electrode assembly 102 is produced.

In the fifth embodiment, as shown in FIG. 12, when the components of the fuel cell 100 are compressed together (tightened together), the tightening margin of the power generation area 46 is Tam+Tac+Taa−Tcell, and the tightening margin of the impregnation area 114 is Tbm+Tbc+Tba−Tcell. Further, in the power generation area 46, the gas diffusion layer 20b, 22b are provided on both surfaces 18a, 18b of the solid polymer electrolyte membrane 18, and in the impregnation area 114, the resin impregnated portions 110a, 112a are provided on the gas diffusion layers 20b, 22b.

Thus, in the case where the tightening margin of the power generation area 46 and the tightening margin of the impregnation area 114 have the same size, the surface pressure applied to the impregnation area 114 is higher than the surface pressure applied to the power generation area 46. It is because if the tightening margins are the same, the surface pressure applied to the impregnation area=the surface pressure applied to the power generation area×Eb/Ea.

In the impregnation area 114, by reducing the tightening margin, the surface pressure during the use needs to be reduced. Further, since power generation is not performed in the impregnation area 114, it is desired to reduce the surface pressure applied to the impregnation area 114 in comparison with the surface pressure applied to the power generation area 46.

Figure 16:
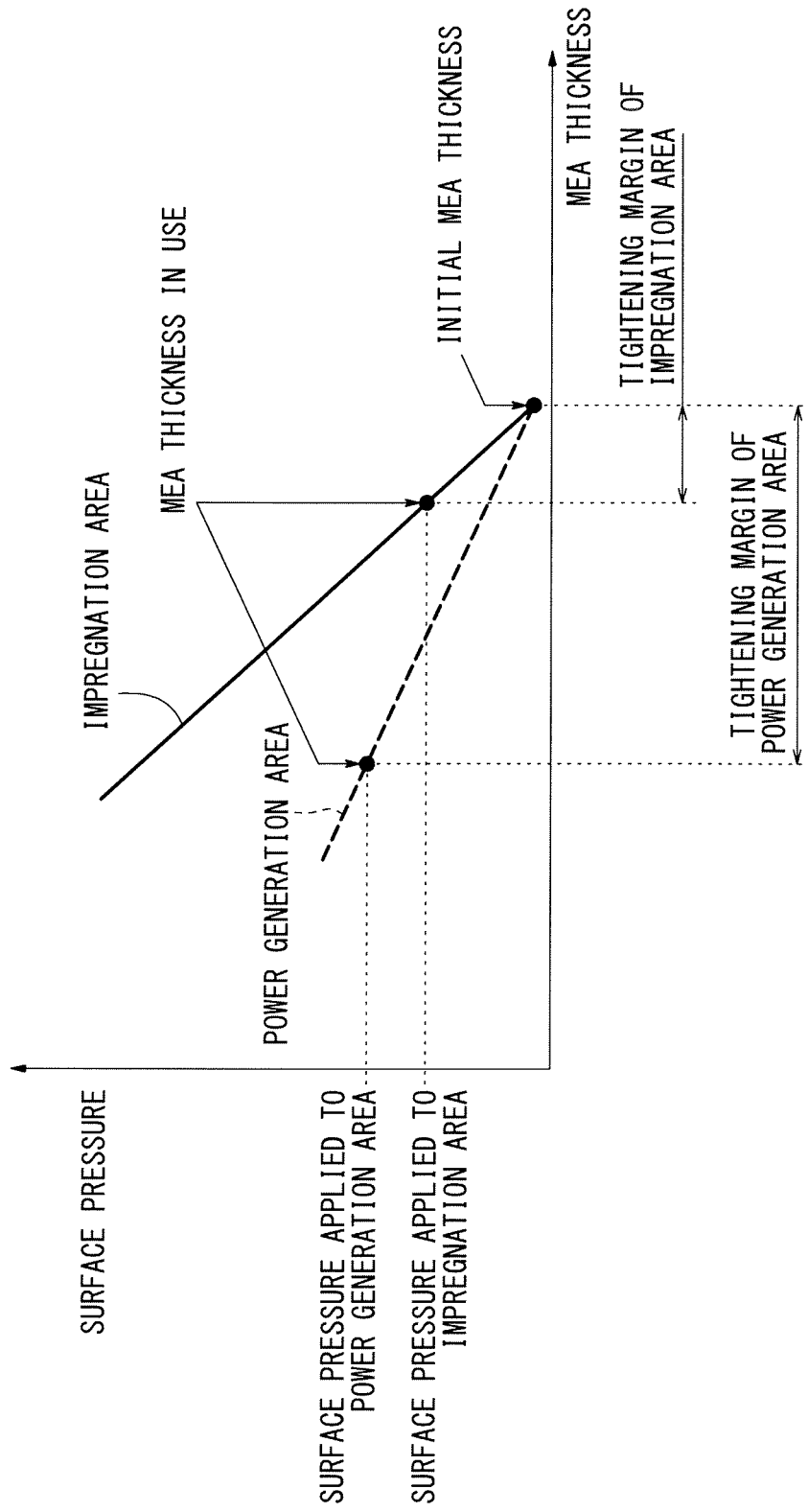
FIG. 16 is a graph showing a relationship between the thickness of the MEA, the surface pressure applied to a power generation area, and the surface pressure applied to an impregnation area.
Figure 17:
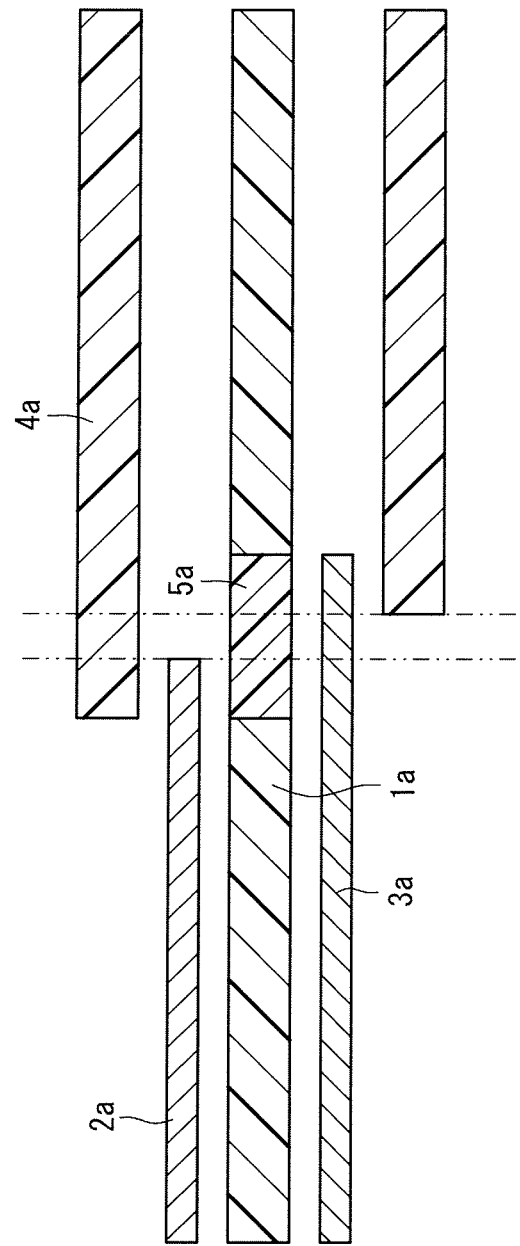
FIG. 17 is a view showing a membrane electrode assembly disclosed in a conventional technique 1.
Figure 18:
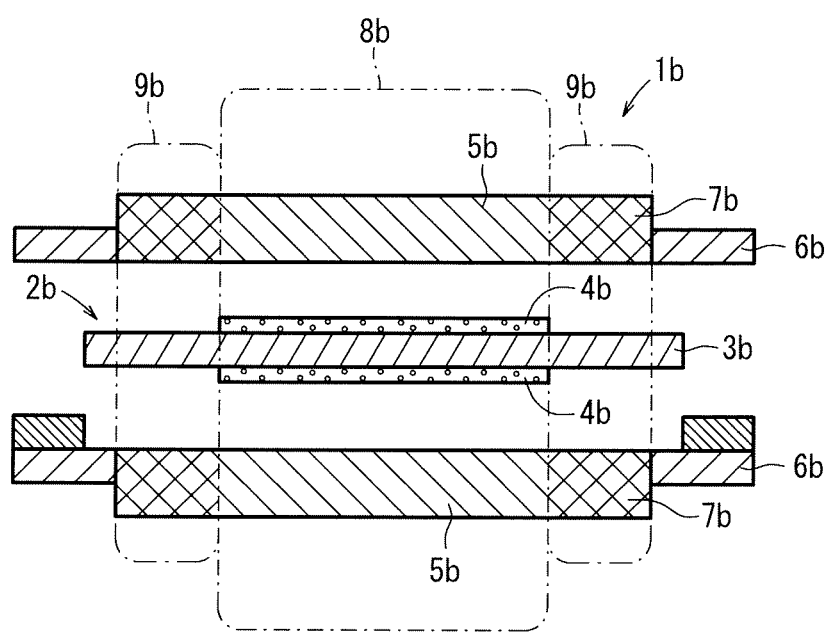
FIG. 18 is a view showing a solid polymer electrolyte fuel cell disclosed in a conventional technique 2.

By satisfying the relationship of Tam+Tac+Taa−Tcell>(Tbm+Tbc+Tba−Tcell)×Eb/Ea, the surface pressure applied to the power generation area becomes larger than the surface pressure applied to the impregnation area when the components of the fuel cell 100 are tightened together. That is, as shown in FIG. 16, based on the relationship between the thickness of the membrane electrode assembly 102 (thickness of the MEA) and the surface pressures, the tightening margin in the power generation area and the tightening margin in the impregnation area corresponding to a desired surface pressure applied to the power generation area and a desired surface pressure applied to the impregnation area are calculated.

Thus, in the power generation area 46, the required surface pressure is secured to achieve the desired power generation performance, and in the impregnation area 114, the surface pressure applied to the solid polymer electrolyte membrane 18 is suppressed. Thus, in the fifth embodiment, the desired power generation performance is achieved, and it becomes possible to suitably suppress damage or the like to the solid polymer electrolyte membrane 18 in the impregnation area 114.

While the invention has been particularly shown and described with reference to preferred embodiments, it will be understood that variations and modifications can be effected thereto by those skilled in the art without departing from the spirit of the invention as defined by the appended claims.

What is claimed is:

1. A fuel cell comprising a membrane electrode assembly, and separators provided on both surfaces of the membrane electrode assembly, the membrane electrode assembly including a first electrode, a second electrode, and a solid polymer electrolyte membrane interposed between the first electrode and the second electrode, the first electrode and the second electrode each including an electrode catalyst layer and a gas diffusion layer, the membrane electrode assembly including a power generation area where the solid polymer electrolyte membrane is interposed between the first electrode and the second electrode and an edge area where the solid polymer electrolyte membrane is sandwiched between an outer end of the electrode catalyst layer of the first electrode and an outer end of the electrode catalyst layer of the second electrode, wherein a recess for receiving therein the edge area is formed into a surface of at least one of the separators which contacts the membrane electrode assembly, wherein the outer end of the electrode catalyst layer of the first electrode protrudes outward beyond the outer end of the electrode catalyst layer of the second electrode in a peripheral direction along longitudinally extending surfaces of the electrodes, said peripheral direction being substantially perpendicular to a stacking direction of the fuel cell, wherein the recess projects in the stacking direction of the fuel cell assembly into the surface of the separator to define a cut out space extending from the surface into the separator, and the edge area projects in the stacking direction of the fuel cell into the recess when the membrane electrode assembly and the separators are assembled together, wherein the recess in the surface of the separator is outside of the power generation area of the membrane electrode assembly, and wherein both of an outer end of the gas diffusion layer of the first electrode and an outer end of the gas diffusion layer of the second electrode protrude outward beyond an outer end of the recess in the surface of the separator in said peripheral direction, and one of the gas diffusion layers extends continuously from the power generation area to the edge area, over the recess and beyond the recess so as to protrude outward of the recess in the surface of the separator in the peripheral direction.

2. The fuel cell according to claim 1, wherein a protective film is provided around the gas diffusion layer.

3. The fuel cell according to claim 1, wherein a protective film is provided between and in engagement with the solid polymer electrolyte membrane and the gas diffusion layer of the first electrode or the second electrode.

4. The fuel cell according to claim 1, wherein when components of the fuel cell are stacked together, a gap is formed between the membrane electrode assembly and the separator outside the edge area in the peripheral direction along the longitudinally extending surfaces of the electrodes.

5. A fuel cell comprising a membrane electrode assembly, and separators provided on both surfaces of the membrane electrode assembly, the membrane electrode assembly including a first electrode, a second electrode, and a solid polymer electrolyte membrane interposed between the first electrode and the second electrode, the first electrode and the second electrode each including an electrode catalyst layer and a gas diffusion layer, the membrane electrode assembly including a power generation area where the solid polymer electrolyte membrane is interposed between the first electrode and the second electrode and an edge area where the solid polymer electrolyte membrane is sandwiched between an outer end of the electrode catalyst layer of the first electrode and an outer end of the electrode catalyst layer of the second electrode, wherein a recess for receiving therein the edge area is formed into a surface of at least one of the separators which contacts the membrane electrode assembly, wherein the outer end of the electrode catalyst layer of the first electrode protrudes outward beyond the outer end of the electrode catalyst layer of the second electrode in a peripheral direction along longitudinally extending surfaces of the electrodes, said peripheral direction being substantially perpendicular to a stacking direction of the fuel cell, wherein the recess projects in the stacking direction of the fuel cell assembly into the surface of the separator to define a cut out space extending from the surface into the separator, and the edge area projects in the stacking direction of the fuel cell into the recess when the membrane electrode assembly and the separators are assembled together, wherein the recess in the surface of the separator is outside of the power generation area of the membrane electrode assembly, wherein a protective film is provided between the solid polymer electrolyte membrane and the gas diffusion layer of the first electrode or the second electrode, wherein the protective film overlaps with the outer end of the catalyst layer of the first electrode or the second electrode, and wherein the gas diffusion layer of the first electrode or the second electrode extends continuously from the power generation area to the edge area, over the recess and beyond the recess so as to protrude outward of the recess in the surface of the separator in the peripheral direction.

6. The fuel cell according to claim 5, wherein the protective film is in engagement with the solid polymer electrolyte membrane and the gas diffusion layer of the first electrode or the second electrode.

* * * * *